(12) United States Patent
Linde

(10) Patent No.: US 10,181,030 B2
(45) Date of Patent: Jan. 15, 2019

(54) BLOCKING ROUTINE REDIRECTION

(71) Applicant: Citrix Systems, Inc., Fort Lauderdale, FL (US)

(72) Inventor: David Linde, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 69 days.

(21) Appl. No.: 14/808,601

(22) Filed: Jul. 24, 2015

(65) Prior Publication Data

US 2017/0024560 A1    Jan. 26, 2017

(51) Int. Cl.
*G06F 21/55* (2013.01)
*G06F 21/52* (2013.01)
*G06F 21/30* (2013.01)
*G06F 21/53* (2013.01)

(52) U.S. Cl.
CPC .......... *G06F 21/554* (2013.01); *G06F 21/305* (2013.01); *G06F 21/52* (2013.01); *G06F 21/53* (2013.01); *G06F 2221/033* (2013.01); *G06F 2221/2123* (2013.01); *G06F 2221/2143* (2013.01)

(58) Field of Classification Search
CPC .................................................... G06F 21/554
USPC .......................................................... 726/1
See application file for complete search history.

(56) References Cited

U.S. PATENT DOCUMENTS

| | | | | |
|---|---|---|---|---|
| 5,452,456 | A * | 9/1995 | Mourey | G06F 9/45504 712/202 |
| 5,842,017 | A * | 11/1998 | Hookway | G06F 8/52 712/E9.037 |
| 5,974,549 | A | 10/1999 | Golan | |
| 7,971,255 | B1 * | 6/2011 | Kc | G06F 21/566 713/164 |
| 9,600,661 | B2 * | 3/2017 | Safa | G06F 21/52 |
| 9,923,840 | B2 * | 3/2018 | Cameron | G06F 9/3004 |
| 2007/0113291 | A1 | 5/2007 | Dai et al. | |

(Continued)

OTHER PUBLICATIONS

Oct. 11, 2016 (WO) Notification of Transmittal of the International Search Report and Written Opinion—App. PCT/US2016/043457.

(Continued)

*Primary Examiner* — Khalil Naghdali
(74) *Attorney, Agent, or Firm* — Banner & Witcoff, Ltd.

(57) ABSTRACT

Disclosed herein are methods, systems, and computer-readable media for blocking attempts at runtime redirection and attempts to change memory permissions during runtime. The present disclosure describes features that enable runtime detection of an attempt to redirect routines or change memory permissions, and determining whether to allow or deny the attempt. Such features may include changing memory write permissions on memory segments, such as those segments used by dynamic loaders after call associations have been saved or otherwise created. Other features may include swapping the addresses of system routines (e.g., open, read, write, close, etc.) to new routines that perform the same function as well as additional functionality configured to detect attempts to redirect or change memory permissions. Once detected by the new routine during runtime, a determination may be made to deny or allow the call based on a policy.

20 Claims, 7 Drawing Sheets

(56) References Cited

U.S. PATENT DOCUMENTS

2012/0255012 A1* 10/2012 Sallam .................... G06F 21/52
　　　　　　　　　　　　　　　　　　　　　　726/24
2015/0154501 A1* 6/2015 Boddhu ............. G06F 17/2765
　　　　　　　　　　　　　　　　　　　　　　706/52

OTHER PUBLICATIONS

Michael Backes et al, "AppGuard Enforcing User Requirements on Android Apps," Mar. 16, 2013 (Mar. 16, 2013) Tools and Algorithms for the Construction and Analysis of Systems, Springer Berlin Heidelberg, Berlin, Heidelberg, pp. 543-548.

* cited by examiner

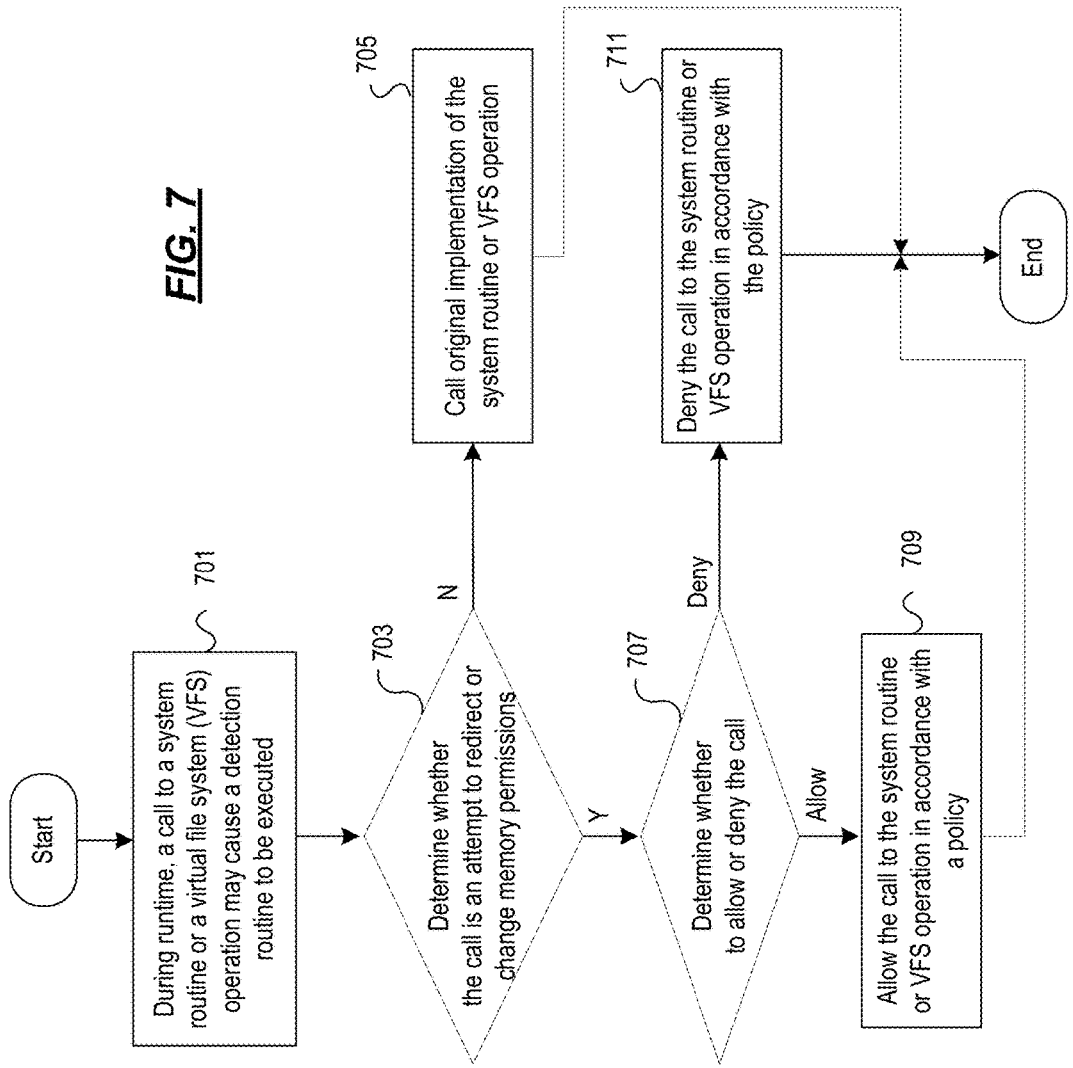

BLOCKING ROUTINE REDIRECTION

BACKGROUND

Aspects described herein generally relate to computer hardware and computer software, including software applications for mobile devices and other computing devices. In particular, one or more aspects of the disclosure are directed to computer software for blocking routine redirection or attempts to change memory permissions.

Mobile devices, such as smart phones, personal digital assistants, tablet computers, and other types of mobile computing devices are useful in personal and business settings. In addition, users of mobile devices may install various mobile software applications suitable for a variety of purposes. Mobile software applications may be developed by different entities and distributed from different sources, such as companies developing mobile business applications for their employees or independent software vendors developing mobile consumer applications for public consumers. These software applications could be modified during runtime by redirecting routine calls to different routines. When redirected, malicious code could be executed that alters or disrupts normal runtime behavior.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. By performing various aspects of this disclosure, attempts to redirect routines or change memory permissions, attempts to execute malicious or otherwise unintended code that alters or disrupts normal runtime behavior may be blocked or prevented.

Some aspects of the disclosure relate to various systems, methods and features that provide for the runtime detection of attempts to redirect routines or change memory permissions. For example, various mechanisms for detecting runtime attempts to redirect or change memory permissions may be established. Establishing such mechanisms may include, in some embodiments, determining a set of routines to replace, retrieving a table entry for one routine of the set of system routines from a symbol table; and determining an address of the one routine from the table entry for the one routine. Additionally, establishing various mechanisms for detecting runtime attempts to redirect or change memory permissions may include changing memory permissions to prevent writing to particular memory segments, or establishing mechanisms, such as one or more other detection routines, for monitoring calls to one or more virtual file system operations. Detection routines may, in some embodiments, be defined as a routine that includes code configured to detect an attempt to perform a runtime redirection and to detect an attempt to change memory permissions, and/or code configured to determine whether to allow or deny a detected attempt to perform a runtime redirection or change memory permissions Other aspects of the disclosure relate to various systems, methods and features that provide for a determination of whether to allow or deny an attempt to redirect routines or change memory permissions during runtime. For example, determining whether to allow or deny an attempt to redirect routines or change memory permissions during runtime may include executing, in response to a call to a system routine or a virtual file system operation, one of the detection routines. Execution of the detection routine may include determining whether the call is an attempt to redirect or change memory permissions; determining whether to allow or deny the call; and based on determining whether to allow or deny the call; selecting between allowing the call in accordance with a policy or denying the call in accordance with the policy.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 7 illustrates an example algorithm for determining whether to allow or deny a detected redirection or attempt to change memory permissions in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

As a general introduction to the subject matter described in more detail below, aspects described herein are directed towards features that enable runtime detection of an attempt to redirect routines or change memory permissions during runtime, and determining whether to allow or block the attempt. Such features may include changing memory write permissions, such as on data segments used by dynamic loaders after the call associations have been saved or created. Other features may include swapping the addresses of system routines (e.g., open, read, write, close, etc.) to new routines that perform the same function as well as additional functionality configured to detect attempts to redirect or change memory permissions. Once detected by the new routine during runtime, a determination may be made to block or allow the call based on a policy Methods and systems supporting one or more of these features are described in further detail below. Before discussing these concepts in greater detail, however, several examples of computing devices and system architectures that may be used in implementing and/or otherwise providing various aspects of the disclosure will first be discussed with respect to FIGS. 1-4.

Computing Architecture

Figure 1:
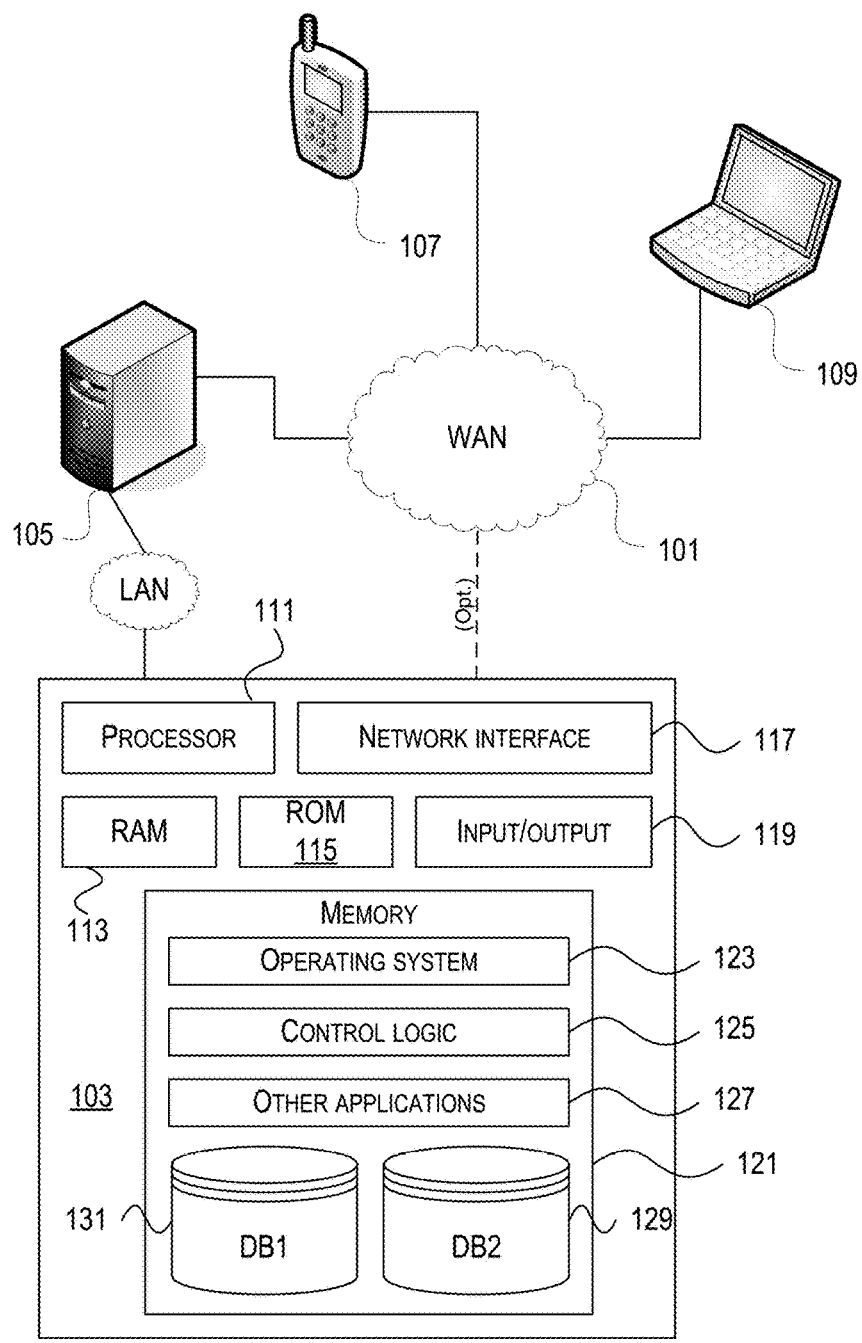
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
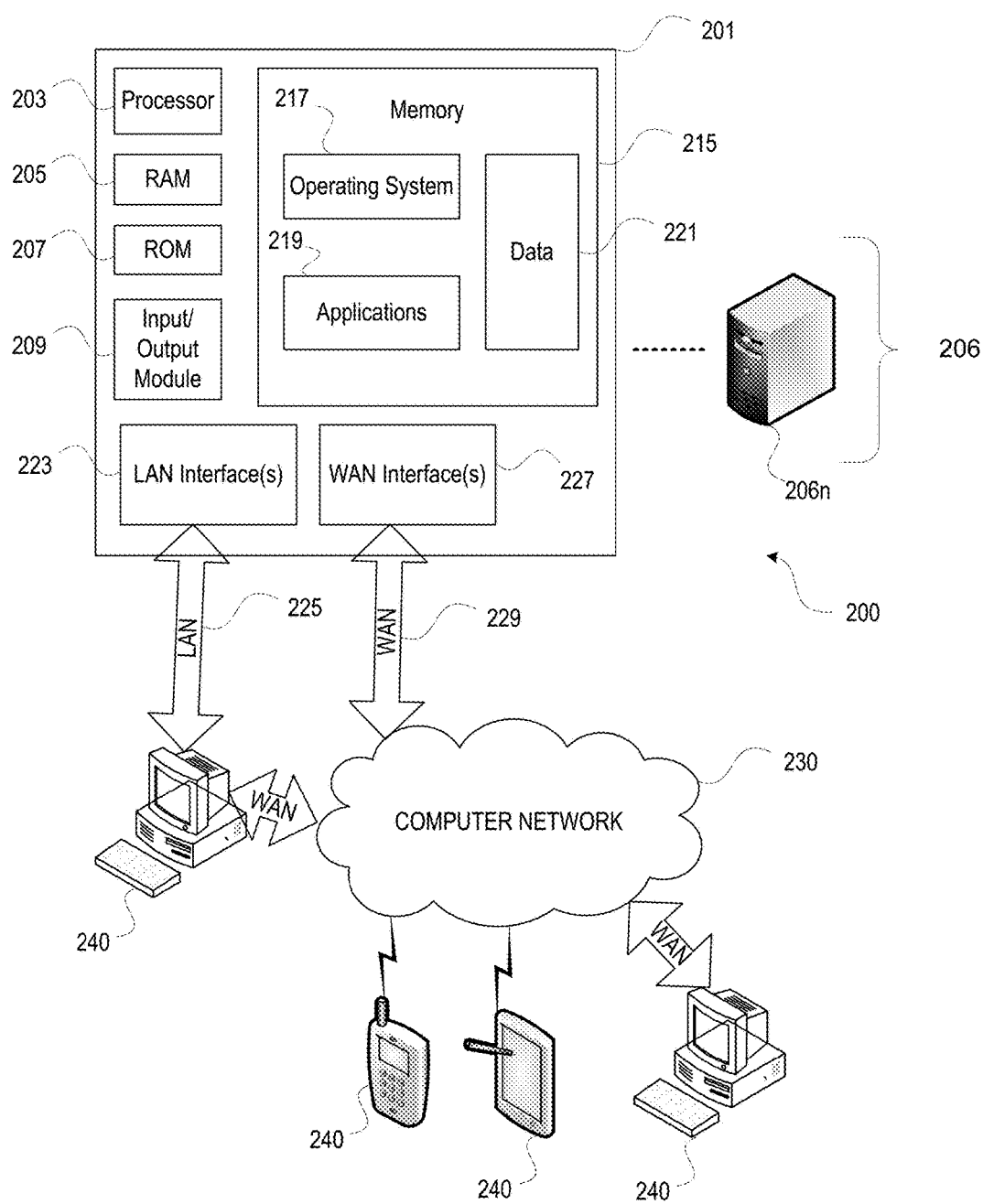
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
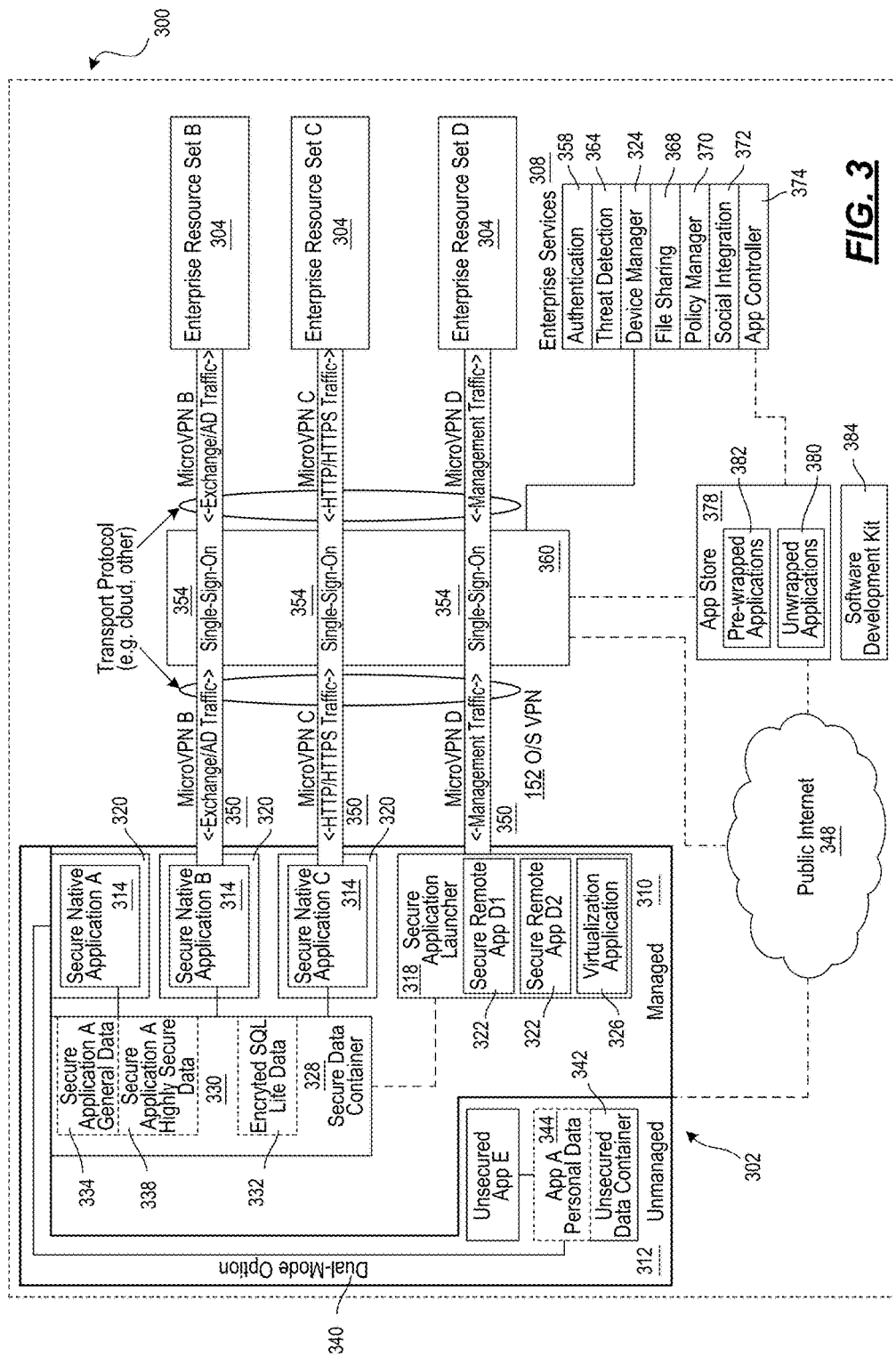
FIG. 3 depicts an illustrative enterprise mobility management system.

FIG. 3 represents an enterprise mobility technical architecture 300 for use in a BYOD environment. The architecture enables a user of a client device (e.g., mobile device) 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 302 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 548 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like 352. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, Hyper-Text Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
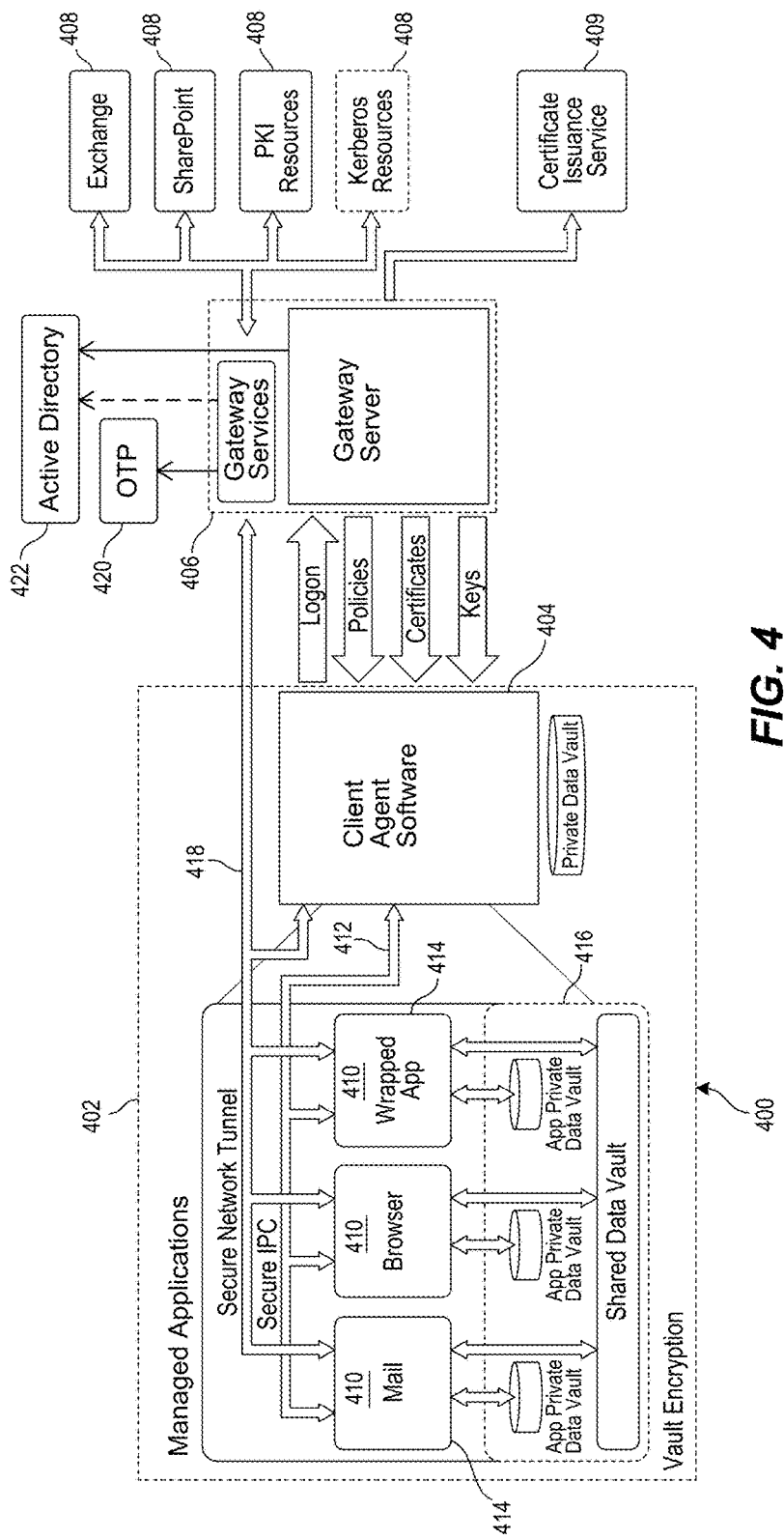
FIG. 4 depicts another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 400 described above with reference to FIG. 3 and may include additional features not mentioned above.

In this case, the left hand side represents an enrolled client device (e.g., mobile device) 402 with a client agent 404, which interacts with gateway server 406 (which includes Access Gateway and application controller functionality) to access various enterprise resources 408 and services 409 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature in which gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, in which all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, in which application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, in which after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, in which a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be serviced from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Embodiments

Having discussed several examples of computing architectures and the enterprise mobility management architecture that may be used in providing and/or implementing various aspects of the disclosure, a number of embodiments will now be discussed in greater detail. In particular, and as introduced above, some aspects of the disclosure generally relate to blocking routine redirection and changing memory permissions. The present disclosure describes features that enable runtime detection of an attempt to redirect routines or change memory permissions during runtime, and determining whether to allow or block the attempt. Such features may include changing memory write permissions, such as on data segments used by dynamic loaders after the call associations have been saved or created. Other features may include swapping the addresses of system routines (e.g., open, read, write, close, etc.) to new routines that perform the same function as well as additional functionality configured to detect attempts to redirect or change memory permissions. Once detected by the new routine during runtime, a determination may be made to block or allow the call based on a policy.

Figure 5:
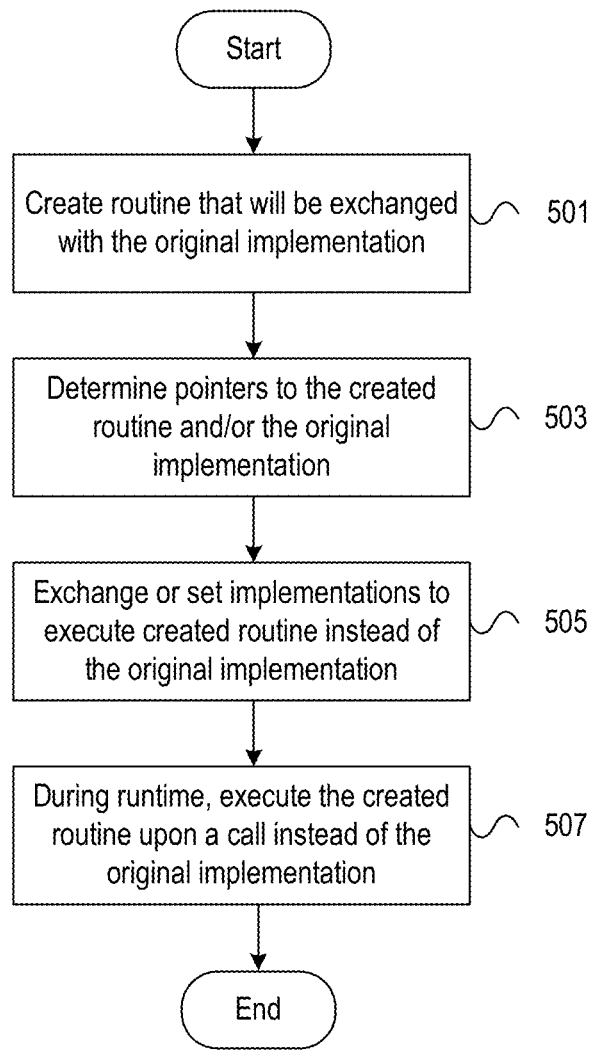
FIG. 5 illustrates an example algorithm of swizzling, call redirection or routine hooking to inject malicious code during runtime.
Figure 6:
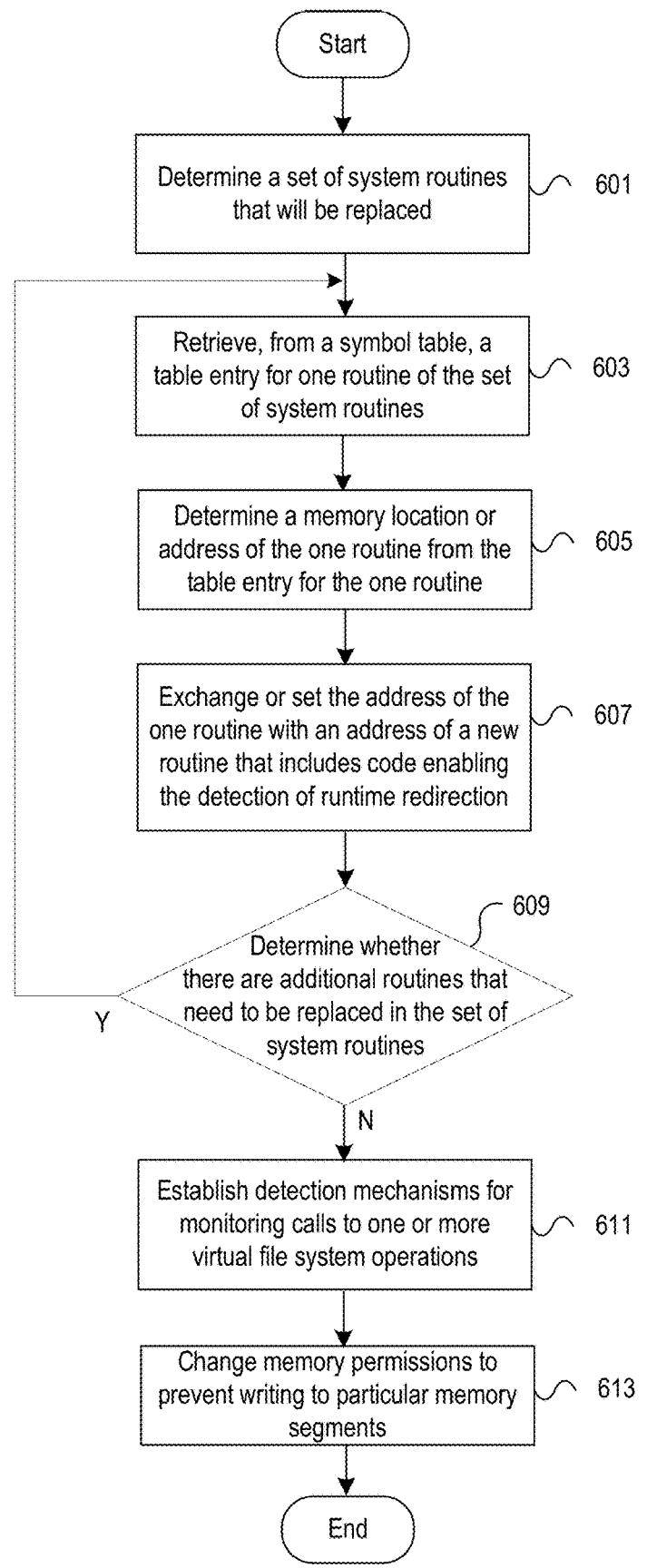
FIG. 6 illustrates an example algorithm for establishing mechanisms for detecting runtime redirection in accordance with one or more illustrative aspects described herein.

FIGS. 5-7 illustrate various examples of algorithms and methods in accordance with one or more features described herein. The features, algorithms and methods described below in reference to FIGS. 5-7 may be performed by a computing device or a combination of devices, such as the various computing devices and systems shown in FIGS. 1-4. The features, steps, algorithms and methods described below in reference to FIGS. 5-7 may, in some instances, be performed in any order, and one or more features, steps, algorithms or methods may be omitted and/or added. One or more aspects illustrated in FIGS. 5-7 relate to blocking routine redirection and/or preventing an attempt to change memory permissions. For example, applications on the mobile device 302 or 402, such as applications from the application store 378, managed applications 410, or applications in unmanaged partition 312 may be injected with malicious code by redirecting system calls or calls to other routines to different routines that include the malicious code. By performing the example algorithms or methods of FIGS. 5-7, attempts to execute malicious code may be prevented or otherwise blocked.

In particular, one manner in which malicious code may be injected is by swizzling, call redirection or routing hooking. Swizzling, call redirection or routine hooking may change the functionality of a method or routine by replacing one implementation with another. In various instances, swizzling, call redirection and routing hooking can be performed at runtime. FIG. 5 illustrates an example method of swizzling, call redirection or routing hooking to inject malicious code during runtime. In particular, FIG. 5 illustrates an example algorithm of swizzling, call redirection or routine hooking, e.g., using Objective-C, which allows for the swizzling of routines via the Objective-C Runtime. Objective-C Runtime is a library that includes various methods for classes and objects in Objective-C. Additionally, the Objective-C Runtime is primarily coded in C and assembly language and, broadly, provides the object-oriented features of Objective-C. There are a number of ways in which Objective-C can be swizzled. The steps of FIG. 5 will be described in connection with two different types of swizzling, call redirection or routine hooking: one that exchanges implementations of Objective-C methods to replace an original implementation, and another that sets the implementation to a C method to replace the original implementation. For brevity, when referring to swizzling, call redirection or routine hooking, the below examples will refer only to a routine being swizzled or a routine being redirected.

At step 501, a routine that will be exchanged for the original implementation is created. As one example, an Objective-C routine may be created. The Objective-C routine may include additional code and, often, may call the original implementation. For example, if one wants to add to the functionality of a routine that opens a file, a new routine may be written that includes code for performing the desired additional functionality and also calls the routine that opens a file. During compilation, Objective-C can generate structures that define a routine and by manipulating these structures (as described in connection with steps 503 and 505 of FIG. 5) the original implementation may be swizzled or redirected. In Objective-C, the structure that defines a routine includes a selector name for the routine, a string of the parameters and return value for the routine, and a pointer to the memory location of the routine.

As a second example, a C routine may be created. The C routine may conform to the signature of the routine that is to be swizzled or redirected. The signature of the routine includes any parameters that are passed when calling the routine, as well as the hidden parameters that every Objective-C method uses (e.g., a reference to self and a selector of the routine). As will be described in connection with steps 503 and 505, this C routine may be set as the implementation to successfully swizzle or redirect the original implementation. Similar to the Objective-C routine, the C routine may include code for performing desired additional functionality and, often, may call the original implementation.

The additional code of the Objective-C routine and the C routine may, in some instances, include malicious code that alters the functionality of software in ways that are undesirable to the software's creator, user of a device, or an employer of the user. One of the features of the present disclosure is to block runtime redirections, such as swizzling, to prevent the execution of such malicious code.

At step 503, pointers to the created routine and/or the original implementation may be determined. For the example using the Objective-C routine, the pointer to the original implementation can be determined using the 'class_getInstanceMethod' of the Objective-C Runtime with one of the parameters being the pointer to the selector of the original implementation. The pointer to the created routine may be determined using the 'class_getInstanceMethod' with one of the parameters being the pointer to the selector of the created routine.

For the example using the C routine, the pointer to the created routine can be determined by casting the function as an implementation type of Objective-C (e.g., IMP). The pointer to the original implementation will be determined at step 505.

At step 505, the implementations of the original implementation and the created routine may be exchanged in order to execute the created routine instead of the original implementation. For the example using the Objective-C routine, the implementations may be exchanged using 'method_exchangeImplementations' of the Objective-C Runtime with the parameters being the pointers to the original implementation and the created routine. The exchange causes the structures of the original implementation and the created routine to swap variables. For example, the structure of the original implementation will now include a pointer to the memory location of the created routine. The structure of the created routine will now include a pointer to the memory location of the original implementation.

For the example using the C routine, the implementation of the created routine may be set using the 'method_setImplementation' of the Objective-C Runtime with one of the parameters being the IMP of the created routine. This call returns an IMP of the original implementation of the routine, which can be used to call the original implementation of the routine.

At step 507, the created routine may, during runtime, be executed upon a call instead of the original implementation. After completing the swizzling or redirecting described in the above steps, the created routine may be executed in response to a call to the original implementation. Accordingly, the additional code of the created routine will be executed. The original implementation will often also be executed since the created routine often calls the original implementation (e.g., via a self-call, which causes the original implementation to be executed due to the call to 'method_exchangeImplementation'; or via a call to the IMP returned from 'method_setImplementation').

In an attempt to prevent the execution of malicious code caused by runtime redirection, mechanisms for detecting runtime redirection (e.g., swizzling, redirecting, hooking) may be established and, during runtime, a determination may be performed as to whether to allow or deny a detected redirection or attempt to change memory permissions. FIGS. 6 and 7 illustrate example algorithms and methods for establishing the mechanisms for detecting runtime redirection (also referred herein as detection mechanisms) and determining whether to allow or deny a detected redirection or attempt to change memory permissions.

FIG. 6 illustrates an example algorithm for establishing mechanisms for detecting runtime redirection. The mechanisms for detecting runtime redirection may depend on the operating system environment of the device. For example, the mechanisms for detecting runtime redirection in an IOS environment may be different than the mechanisms for detecting runtime redirection in an ANDROID or WINDOWS environment. For example, mechanisms for runtime redirection for the ANDROID environment may be oriented around the Executable and Linkable Format (ELF) instead of an import table and symbol table-oriented design. There may be some common elements, however, for detecting runtime redirection between the different operating system environments. For example, IOS, ANDROID and/or WINDOWS environments may use an import table, so mechanisms for detecting runtime redirection in IOS, ANDROID and/or WINDOWS environments may be oriented around the import table. Mechanisms for detecting runtime redirection in the ANDROID environment may, in some embodiments, be oriented around an import table and symbol table design. The following example of FIG. 6 are directed to establishing mechanisms for detecting runtime redirection in an operating system environment that uses a symbol table and an import table, or otherwise detects runtime redirection via a process that patches text instruction segments.

At step 601, a set of system routines that will be replaced may be determined. The set of system routines may include system routines that are called to read or write memory permissions or other input/output (I/O) functions. For example, in some embodiments, the set of system routines may include a set of file I/O routines such as 'open', 'read', 'pread', 'pwrite', and the like for an IOS environment. In some variations, the set of system routines may include directory handling functions.

At step 603, a table entry from the symbol table for one routine of the set of system routines may be retrieved. Retrieving the table entry may include finding or accessing the symbol table. A symbol table is a data structure that includes various attributes about a compiled or interpreted function (as well as other identifiers in source code), such as a type of the function, a scope of the function, and a memory location of the function. Various symbol tables that include table entries for the one routine of the set of system routines may be in a global symbol table (e.g., the global symbol table may include the table entries for 'open', 'read', 'pread', 'pwrite', and the like). Thus, the global symbol table may be accessed and iterated through to search for the table entry of the one routine.

In some embodiments, calls to 'dlopen' and 'dlsym' may be used to retrieve the table entry for the one routine. For example, passing in a null filename parameter to 'dlopen' will return a pointer for the main program that provides access to the global symbol table for the main program. A call to 'dlsym' returns an address where the table entry for a particular symbol in a symbol table is located. Thus, to retrieve the table entry of the one routine, a call to 'dlsym' may be made with parameters of the pointer for the main program returned from the 'dlopen' call and a symbol name of the one routine. The 'dlsym' call may return the address for the table entry for the one routine.

At step 605, a memory location or address of the one routine may be determined from the table entry for the one routine. In some embodiments, determining the memory location or address of the one routine may include access the table entry for the one routine using the address for the table entry for the one routine, which was returned from the call to 'dlsym'.

At step 607, the memory location or address of the one routine may be exchanged or set with a memory location or address of a new routine that includes code configured to detect an attempt at runtime redirection and to detect an attempt to change in memory permissions. Exchanging or setting the address of the one routine with the address of a new routine may include a process similar to that described above in connection with one or more of steps 501, 503 and 505 of FIG. 5. Once exchanged and/or set, the new routine will be executed when a call to the one routine is made.

The new routine may include additional code that enables the detection of runtime redirection. The new routine may also include additional code that enables the determination of whether to allow or deny the redirection. The new routine may further include a call to execute the original implementation of the one routine (e.g., via a self-call, which causes the original implementation to be executed due to the call to 'method_exchangeImplementation'; or via a call to the IMP returned from 'method_setImplementation').

At step 609, it may be determined whether there are additional routines that need to be replaced in the set of system routines. For example, if the set includes the file I/O routines of 'open', 'close', 'pread' and 'pwrite', and only the 'open' function call has been replaced via steps 603-607, the method may proceed back to step 603 to replace the next function in the set of system routines (e.g., 'close', 'pread' or 'pwrite'). If all of the functions have been replaced, the method may proceed to step 611. It is noted that while the examples below will be discussed in terms of the 'open', 'close', 'pread' and 'pwrite' system routines, other types of system routines could be exchanged or set with a new routine, depending on the API of the operating system environment and which system routines are selected for inclusion into the set of system routines that will be replaced.

At step 611, detection mechanisms for monitoring calls to one or more virtual file system operations may be established. In some embodiments, the enterprise mobility management architecture described above may implement a virtual file system (VFS) layer. In some operating system environments (e.g., the IOS environment), the VFS layer may be implemented within a database that stores information for a program or application. Some types of databases (e.g., an SQLITE database) may be configured to perform pre-processing or post-processing for a specific set of operations issued by the database. Detection mechanisms may be established by configuring the database to perform new routines as at least a part of the pre-processing or post-processing. These new routines may include additional code that enables the detection of runtime redirection. These new routines may also include additional code that enables the determination of whether to allow or deny the redirection.

For example, and as will be discussed in greater detail below, if detection mechanisms are established as pre-processing and post-processing for 'xRead' and 'xWrite' operations of a VFS interface for a SQLITE database, the detection mechanisms can determine whether the call to the operation is an attempt to redirect from the current implementation of the 'xRead' or 'xWrite' operation (the current implementation can include any pre-processing or post-processing for the operation), and can then also determine whether to allow or deny the call. It is noted that while the examples below will be discussed in terms of the 'xRead' and 'xWrite' operations, other types of VFS operations could be monitored in addition to or as a replacement for the 'xRead' and 'xWrite' operations, depending on database capabilities and which VFS operations are selected for monitoring via the detection mechanisms.

At step 613, memory permissions may be changed to prevent writing to particular memory segments. For example, after all the system routines have been exchanged or set via steps 603-607 and call associations have been created or saved, memory permissions of memory segments used by a dynamic loader may be set to prevent writing (e.g., set to read-only or set to read-execute). As another example, after all the system routines have been exchanged or set via steps 603-607, an import table has been prepopulated with various addresses and/or other memory associated with the import table has been prepopulated with various addresses, the memory locations associated with the various addresses may be set to be read-only. Changing memory permissions may, in some instances, prevent attempts to overwrite or otherwise change data stored in particular segments of memory. Changing memory permissions may, in some instances, increase the effectiveness of the mechanisms for detecting runtime redirection by requiring an attempt to change memory permissions to overwrite or otherwise change data stored in particular segments of memory.

Additionally, it is noted that step 613 could be performed before all the system routines have been exchanged or set via steps 603-607, an import table has been prepopulated with various addresses and/or other memory associated with the import table has been prepopulated with various addresses. In such arrangements, steps 603-607 would include the ability to catch and handle memory access fault exceptions for memory address ranges associated with the import table.

After establishing the mechanisms for detecting runtime redirection, when various calls to the system routines are made during runtime, the established mechanisms may determine whether each call is attempting to perform a redirection or change memory permissions, and may determine whether to allow or deny the redirection or change. In the following example of FIG. 7, the "new routines" of FIG. 6 (see, e.g., step 607 and 611 of FIG. 6) will collectively be referred to as "detection routines." Detection routines may, in some embodiments, be defined as a routine that includes code configured to detect an attempt to perform a runtime redirection and detect an attempt to change memory permissions, and/or code configured to determine whether to allow or deny a detected attempt to perform a runtime redirection or change memory permissions. FIG. 7 illustrates an example algorithm for determining whether to allow or deny a detected redirection or attempt to change memory permissions.

At step 701, during runtime, a call to a system routine that has been exchanged or set to a detection routine or a call to a VFS operation that has been established to execute a detection routine as pre-processing may cause a detection routine to be executed. In other words, the detection routine is executed in response to a call to a corresponding system routine or VFS operation. For example, if detection routines were exchanged or set for the system routines of 'open', 'close', 'pread' and 'pwrite' (via steps 601-609 of FIG. 6), any call to 'open', 'close', 'pread' or 'pwrite' may cause a respective detection routine to be executed. If detection routines were established to execute as pre-processing for 'xRead' or 'xWrite' (via step 613), any call to 'xRead' or 'xWrite' may cause a respective detection routine to be executed. Steps 703-711 of FIG. 7 illustrate features performed by a detection routine during its execution.

At step 703, it may be determined whether the call is an attempt to redirect or change memory permissions. This determination may be made in various ways and take into account different contextual information related to the call. For example, in making the determination of whether the call is an attempt to redirect or change memory permissions, one or a combination of the following may be analyzed or used: the routine or operation called; the parameters passed to the detection routine via the call; and/or information of the program stack.

If the determination is based on the routine or operation called, the type of the routine or operation may be determined and, based on the type of routine or operation, it may be determined that the call is an attempt to redirect or change memory permissions. For example, if the type is determined to be a routine or operation that writes to a memory location or a virtual file system, such as 'xWrite' or 'pwrite', the call may be determined to be an attempt to redirect or change memory permissions. As another example, if the type is determined to be a routine or operation that changes a memory permission to a virtual file system or other type of memory, it may be determined to be a routine or operation that writes to a memory location or a virtual file system.

If the determination is based on the parameters passed to the detection routine via the call, the parameters may be analyzed and, based on the parameters, it may be determined that the call is an attempt to redirect or change memory permissions. For example, if certain parameters are present or the parameters have certain values, the call may be determined to be an attempt to redirect or change memory permissions.

The determination, in some embodiments, may be based on a combination of the type of the routine or operation and the parameters passed to the detection routine via the call. For example, if the operation or routine is of a particular type (e.g., a routine or operation that writes to a memory location; or a routine or operation that changes memory permissions) and has a parameter specifying a memory address within a particular segment of memory (e.g., the memory segment for the original implementation of a system routine or the memory segment of a detection routine; a memory segment for a virtual file system; or a memory segment previously made read-only via step 613 of FIG. 6), it may be determined that the call is an attempt to redirect or change memory permissions.

If the determination is based on information of the program stack, the contents of the program stack may be analyzed and, based on the contents of the program stack, it may be determined that the call is an attempt to redirect or change memory permissions. For example, the determination may be based on one or a combination of the following, which can be determined via the contents of the program stack: which program or routine made the call; whether there has been a call to 'dlsym' or 'dlopen' within a threshold number of calls; or a location in a program where the call was made or where control will be returned upon completing the processing associated with the call. In some embodiments, if a third party application (e.g., an application supplied by a provider different from the manufacturer of the computing device or the employer) or an unmanaged application from unmanaged partition 312 made the call, it may be determined that the call is an attempt to redirect or change memory permissions. In some embodiments, if there has been a call to 'dlsym' or 'dlopen' within a threshold of 5 calls, it may be determined that the call is an attempt to redirect or change memory permissions.

If it is determined that the call is an attempt to redirect or change memory permissions, the algorithm may proceed to step 707. If it is determined that the call is not an attempt to redirect or change memory permissions, the algorithm may proceed to optional step 705 or may end.

At optional step 705, if the call to the system routine is determined to not be an attempt to redirect or change memory permissions, the original implementation of the system routine or operation may be called. For example, some detection routines, such as the detection routines for the system routines of 'open', 'close', 'pread' and 'pwrite', will include a call to the original implementation of the system routine (e.g., via a self-call, which causes the original implementation to be executed due to the call to 'method_exchangeImplementation'; or via a call to the IMP returned from 'method_setImplementation'). Accordingly, a call to the original implementation may be made, which includes the parameters passed to the detection routine.

In some instances, the call to the original implementation may not be performed. For example, some detection routines, such as the detection routines for the VFS operations of 'xRead' and 'xWrite', may perform steps 703, 707 and at least portions of steps 709 and 711 as part of pre-processing of the VFS operation. Accordingly, the VFS operation may be performed once the pre-processing is complete, so no call needs to be made by the detection routine.

At step 707, if the call to the system routine is determined to be an attempt to redirect or change memory permissions, it may be determined whether to allow or deny the call based on a policy. This determination may be made on similar information described above in connection with step 703. For example, in making the determination of whether to allow or deny the call, one or a combination of the following may be analyzed or used: the routine or operation called; the parameters passed to the detection routine via the call; and/or information of the program stack.

In some embodiments, the exact information used when performing the determination of step 707 may be different from the information used when performing the determination of step 703. For example, if the determination of step 703 is based on the routine or operation called and/or the parameters passed to the detection routine via the call, the determination of step 707 may be further based on the information of the program stack. For example, it may be determined to allow or deny the call based on one or a combination of the following, which can be determined from the contents of the program stack: which program made the call; whether there have been any calls to 'dlsym' or 'dlopen' within a threshold number of calls; or a location in a program where the call was made or where control will be returned upon completing the processing associated with the call. As another example, in some instances, before attempting to change a memory permission to a memory page to allow writing to the memory page, the address of the memory page may be retrieved using a call to 'dlsym'. Accordingly, it may be determined to allow or deny the call based on determining that the call is an attempt to change memory permissions to allow writing to a memory page and determining that there have been a call to 'dlsym' to retrieve the address to the memory page.

Additionally, the information used when performing the determination of step 707 in some embodiments may be based on the application that made the call. For example, some applications may perform internal initialization that could result in a determination that a call is an attempt to redirect or change memory permissions at step 703. The internal initialization may be needed for proper execution of the application. Accordingly, the policy may include a listing of applications that are allowed to redirect or change memory permissions and it may be determined to allow the call based on determining that the application making the call is on the listing of applications.

If it is determined to allow the call to the system routine or VFS operation, the algorithm may proceed to step 709. If it is determined to deny the call to the system routine or VFS operation, the algorithm may proceed to step 711.

At step 709, the call to the system routine may be allowed in accordance with a policy. For example, a policy may be implemented such that the call is allowed without modifying the call or the parameters passed to the detection routine. Accordingly, the original implementation of the system routine may be called with the parameters passed to the detection routine, or the pre-processing may be completed to allow the VFS operation to be executed.

Alternatively, a policy may be implemented such that the call is allowed with modification. For example, the parameters may be modified so that a different memory segment is written to, or a different change in memory permissions is performed. For example, if the call is to change memory permissions to read-write-execute, the call may be allowed to make a change of read-execute or read-write instead of read-write-execute.

Further, in some instances, features related to allowing the call may be performed during both pre-processing and post-processing of a VFS operation. For example, if the call was allowed but with modification, the modification may include pre-processing that changes the data stored in the memory locations of the parameters that were passed to the detection routine. After the VFS operation is complete, the original values of the parameters may be restored to the memory locations of the parameters.

In some embodiments, the policy may be implemented to determine whether allow the call with or without modification based on information similar to that discussed above in connection with steps 703 and 707.

At step 711, the call to the system routine may be denied in accordance with the policy. For example, a policy may be implemented such that the call is denied and the detection routine throws an exception to the program or routine that made the call. Alternatively, a policy may be implemented such that the call is denied and the detection routine returns a false indication of success to the program or routine that made the call.

Further, in some instances, features related to denying the call may be performed during both pre-processing and post-processing of a VFS operation. For example, if the call was denied, the denial may include pre-processing that changes the parameters for the VFS operation to be illegal or otherwise cause no change to be made (e.g., write to an illegal memory location, pass in null values as the parameters, or the like). After the VFS operation is complete, post-processing may be performed that restores the original values of the parameters.

In some embodiments, the policy may be implemented to determine whether to deny the call with an exception or with a false indication of success based on information similar to that discussed above in connection with steps 703 and 707.

Additionally, during execution of the detection routine (e.g., steps 703-711), a log may be created and/or updated based on the various determinations and other functions performed by the detection routine. For example, the call and the parameters passed to the detection routine may be logged, the information used when performing the determinations of steps 703 and 707 may be logged, and information describing how the call was allowed or denied may be logged.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    establishing one or more mechanisms that cause, in response to each call to a system routine performed by a computing device, execution of a routine that includes code configured to detect an attempt to perform a runtime redirection;
    executing, in response to a first call to the system routine, the routine that includes the code;
    based on executing, in response to the first call, the routine:
        determining, based on determining that the first call is for writing to a memory location associated with the system routine, that the first call is an attempt to redirect from the system routine, and
        based on determining that the first call is an attempt to redirect from the system routine, denying the first call;
    executing, in response to a second call to the system routine, the routine that includes the code; and
    based on executing, in response to the second call, the routine:
        allowing the second call.

2. The method of claim 1, wherein establishing the one or more mechanisms includes exchanging or setting an address of the system routine in a global symbol table with an address of the routine that includes the code.

3. The method of claim 1, wherein the system routine comprises a file input/output (I/O) routine.

4. The method of claim 1, wherein determining that the first call is an attempt to redirect from the system routine is performed based on information of a program stack.

5. The method of claim 1, wherein denying the first call is performed based on information of a program stack.

6. The method of claim 1, wherein the second call is associated with one or more parameters, and wherein allowing the second call is performed without modifying the second call and without modifying the one or more parameters.

7. The method of claim 1, wherein the second call is associated with one or more parameters, and wherein allowing the second call is performed with a modification to the second call or with a modification to the one or more parameters.

8. The method of claim 7, wherein allowing the second call is performed based on information of a program stack.

9. The method of claim 1, further comprising:
    based on denying the first call, throwing an exception or returning a false indication of success.

10. An apparatus comprising:
    one or more processors; and
    memory storing executable instructions configured to, when executed by the one or more processors, cause the apparatus to:
        establish one or more mechanisms that cause, in response to each call to a system routine performed by the apparatus or each call to a virtual file system (VFS) operation performed by the apparatus, execution of a routine that includes code configured to detect an attempt to perform a runtime redirection;
        execute, in response to a first call to the system routine or to the VFS operation, the routine that includes the code;
        based on executing, in response to the first call, the routine:
            determine, based on determining that the first call is for writing to a memory location associated with the system routine or to a virtual file system associated with the VFS operation, that the first call is an attempt to redirect from the system routine or from the VFS operation; and
            based on determining that the first call is an attempt to redirect from the system routine or from the VFS operation, denying the first call;
        execute, in response to a second call to the system routine or to the VFS operation, the routine that includes the code; and
        based on executing, in response to the second call, the routine:
            allow the second call.

11. The apparatus of claim 10, wherein causing the apparatus to establish the one or more mechanisms includes causing the apparatus to exchange or set an address of the system routine in a global symbol table with an address of the routine that includes the code.

12. The apparatus of claim 10, wherein causing the apparatus to establish the one or more mechanisms includes causing the apparatus to establish the routine that includes the code to be executed as pre-processing or post-processing for the VFS operation.

13. A method comprising:
establishing one or more mechanisms that cause, in response to each call to a virtual file system (VFS) operation performed by a computing device, execution of a routine that includes code configured to detect an attempt to perform a runtime redirection;
executing, in response to a first call to the VFS operation, the routine that includes the code;
based on executing, in response to the first call, the routine:
determining, based on determining that the first call is for writing to a virtual file system associated with the VFS operation, that the first call is an attempt to redirect from the VFS operation, and
based on determining that the first call is an attempt to redirect from the VFS operation, denying the first call;
executing, in response to a second call to the VFS operation, the routine that includes the code; and
based on executing, in response to the second call, the routine:
allowing the second call.

14. The method of claim 13, wherein establishing the one or more mechanisms includes establishing the routine that includes the code to be executed as pre-processing or post-processing for the VFS operation.

15. The method of claim 13, wherein the VFS operation comprises an operation of a VFS interface for a database that stores data for an application.

16. The method of claim 13, wherein determining that the first call is an attempt to redirect from the VFS operation is performed based on information of a program stack.

17. The method of claim 13, wherein denying the first call is performed based on information of a program stack.

18. The method of claim 13, wherein the second call is associated with one or more parameters, and wherein allowing the second call is performed without modifying the second call and without modifying the one or more parameters.

19. The method of claim 13, wherein the second call is associated with one or more parameters, and wherein allowing the second call is performed with a modification to the second call or with a modification to the one or more parameters.

20. The method of claim 13, further comprising:
based on denying the first call, throwing an exception or returning a false indication of success.

* * * * *